(12) United States Patent
Do et al.

(10) Patent No.: US 7,852,418 B2
(45) Date of Patent: Dec. 14, 2010

(54) DISPLAY APPARATUS INCLUDING MULTIPLE STORAGE ELECTRODES HAVING SPECIFIC SHAPES

(75) Inventors: Hee-Wook Do, Suwon-si (KR); Yoon-Sung Um, Yongin-si (KR); Seung-Hoo Yoo, Seongnam-si (KR); Kyoung-Ju Shin, Hwaseong-si (KR); Kang-Woo Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 133 days.

(21) Appl. No.: 11/696,108

(22) Filed: Apr. 3, 2007

(65) Prior Publication Data

US 2007/0229745 A1    Oct. 4, 2007

(30) Foreign Application Priority Data

Apr. 4, 2006    (KR) .................... 10-2006-0030646

(51) Int. Cl.
*G02F 1/1343*    (2006.01)
(52) U.S. Cl. .............................. 349/38; 349/39; 349/48
(58) Field of Classification Search .................. 349/38, 349/39, 130, 131, 145, 146
See application file for complete search history.

(56) References Cited

U.S. PATENT DOCUMENTS

| | | | |
|---|---|---|---|
| 5,748,276 A * | 5/1998 | Uno et al. ................... 349/144 |
| 6,028,650 A * | 2/2000 | Kuroha et al. ................. 349/38 |
| 6,281,958 B1 * | 8/2001 | Nakajima .................... 349/141 |
| 6,335,778 B1 * | 1/2002 | Kubota et al. ............... 349/151 |
| 2003/0128225 A1 * | 7/2003 | Credelle et al. ............. 345/694 |
| 2004/0114059 A1 * | 6/2004 | Lee et al. ...................... 349/39 |
| 2004/0233371 A1 * | 11/2004 | Liu et al. .................... 349/143 |
| 2005/0036091 A1 * | 2/2005 | Song .......................... 349/129 |
| 2006/0066797 A1 * | 3/2006 | Baek .......................... 349/139 |

\* cited by examiner

*Primary Examiner*—Andrew Schechter
*Assistant Examiner*—Michael Inadomi
(74) *Attorney, Agent, or Firm*—Innovation Counsel LLP

(57) ABSTRACT

A display apparatus includes a substrate, in which first and second pixel areas are defined. A first pixel electrode including a first main pixel electrode and a first sub-pixel electrode is formed in the first pixel area and a second pixel electrode including a second main pixel electrode and a second sub-pixel electrode is formed in the second pixel area. Adjacent outer contour parts of the first and second pixel electrodes, which face each other, have shapes different from and corresponding to each other, the area ratio of the first main pixel electrode to the first sub-pixel electrode being the same as the area ratio of the second main pixel electrode to the second sub-pixel electrode.

26 Claims, 12 Drawing Sheets

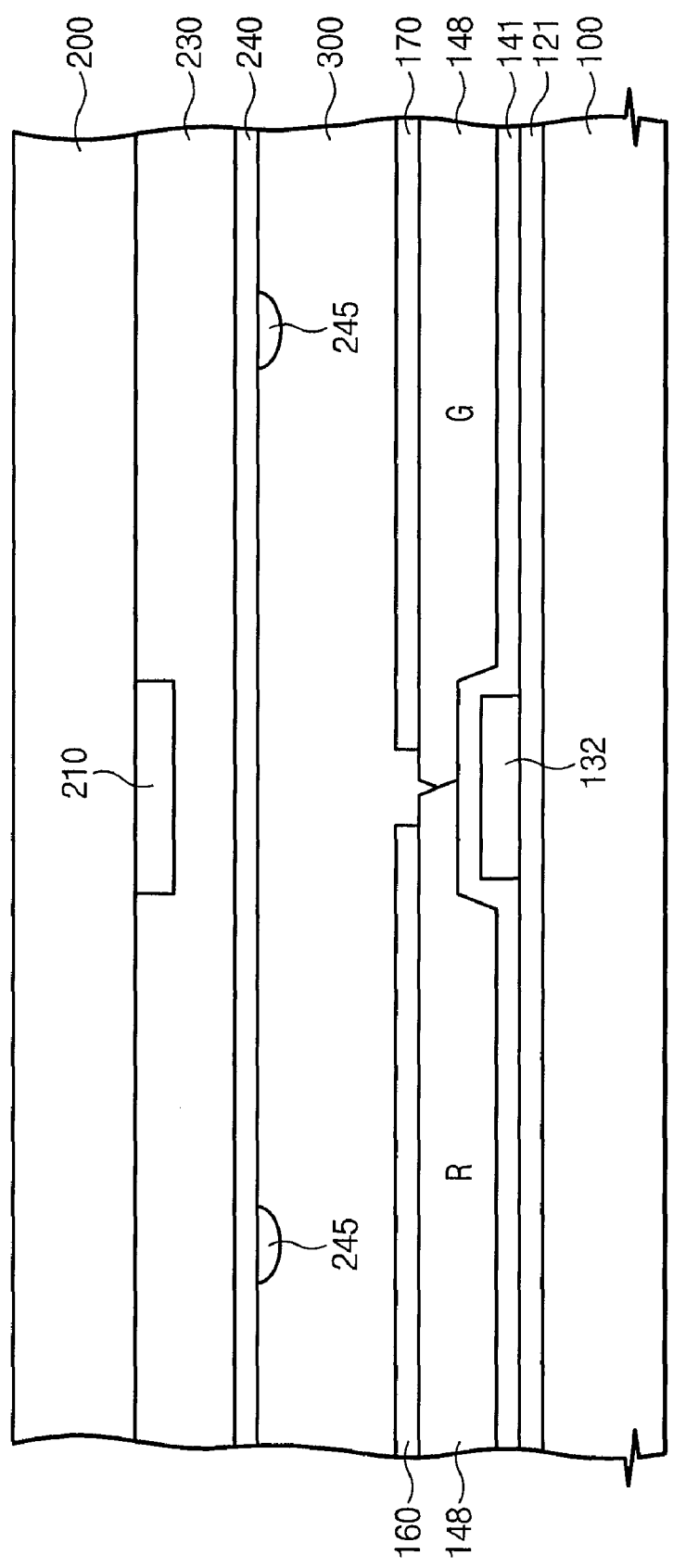

DISPLAY APPARATUS INCLUDING MULTIPLE STORAGE ELECTRODES HAVING SPECIFIC SHAPES

CROSS-REFERENCE TO RELATED APPLICATION

This application relies for priority upon Korean Patent Application No. 2006-30646 filed on Apr. 4, 2006, the contents of which are herein incorporated by reference in its entirety.

FIELD OF THE INVENTION

The present invention relates to a display apparatus having a wide viewing angle and improved operating speed.

DESCRIPTION OF THE RELATED ART

Liquid crystal display devices employ liquid crystals having dielectric and refractive index anisotropy so that the alignment direction of the liquid crystal and the amount of light transmittance is changed in accordance with the applied electric field. However, the image may be distorted when a user views the image from the lateral side of the liquid crystal display device even if the image is properly displayed when the user views the image at the front of the liquid crystal display device. The term "viewing angle" represents the range of angle allowing a user to properly view a displayed image. The liquid crystal display device is generally characterized by a narrow viewing angle compared to CRT displays. It would be advantageous to provide a Liquid crystal display apparatus having a wider viewing angle and better speed of response

SUMMARY OF THE INVENTION

In one aspect of the present invention, a display apparatus includes adjacent first and second pixel areas defined in a first substrate having a first pixel electrode formed in the first pixel area that includes a first main pixel electrode and a first sub-pixel electrode. The second pixel electrode is formed in the second pixel area and includes a second main pixel electrode and a second sub-pixel electrode.

Adjacent outer contour parts of the first and second pixel electrodes, which face each other, have shapes different from and corresponding to each other, while the area ratio of the first main pixel electrode to the first sub-pixel electrode is identical to the area ratio of the second main pixel electrode to the second sub-pixel electrode.

A data voltage corresponding to image information is applied to the first and second pixel electrodes. A higher voltage is applied to first sub-pixel electrode than is applied to the first main pixel electrode. A voltage that is higher than the voltage applied to the second main pixel electrode is applied to the second sub-pixel electrode. The optical characteristics of the device are compensated by the application of the high and low voltages so as to widen the viewing angle. In addition, the size of areas in the first and second pixel electrodes receiving the high voltage is identical to the size of areas receiving the low voltage, the first and second pixel electrodes display images having superior quality.

BRIEF DESCRIPTION OF THE DRAWING

The foregoing and other objects, features and advantages of the present invention will become readily apparent from a reading of the ensuing description together with the drawing, in which:

FIGS. 11A and 11B are sectional views taken along a line V-V' shown in FIG. 10.

DESCRIPTION OF THE EMBODIMENTS

Figure 1:
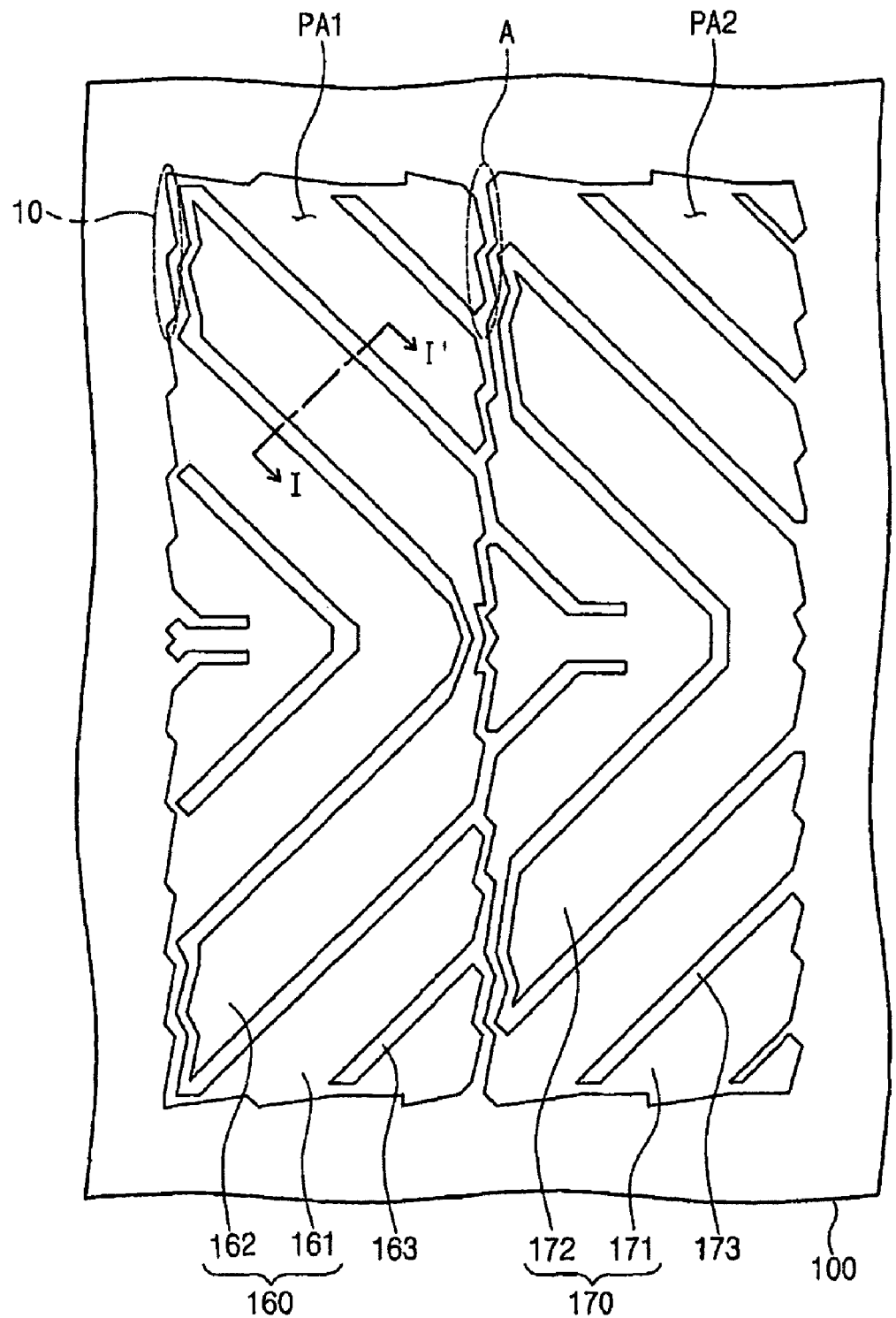
FIG. 1 is a plan view illustrating a liquid crystal display apparatus according to an exemplary embodiment of the present invention.

Referring to FIG. 1, the liquid crystal display apparatus includes a first substrate 100, on which pixel areas PA1 and PA2 are defined, and pixel electrodes 160 and 170 formed on substrate 100. In addition, a second substrate (not shown) facing substrate 100 is prepared and a liquid crystal layer (not shown) having liquid crystals is interposed between substrate 100 and the second substrate. The pixel electrodes 160 and 170 include a first pixel electrode 160 and a second pixel electrode 170 having different shapes. Pixel areas PA1 and PA2 are basic areas that represent an image and have rectangular shapes with length and breadth in a ratio of 1:3.

First and second pixel electrodes 160 and 170 constitute a group and a plurality of pixel electrode groups are repeatedly formed on the first substrate. Each of the first and second pixel electrodes 160 and 170 are divided into two parts, respectively, in which one part having a larger size is called a main pixel electrode 161 and 171 and the other part having a smaller size is called a sub-pixel electrode 162 and 172. Thus, the first pixel electrode 160 is divided into the first main pixel electrode 161 and the first sub-pixel electrode 162, and the second pixel electrode 170 is divided into the second main pixel electrode 171 and the second sub-pixel electrode 172. Main pixel electrodes 161 and 171 are separated from sub-pixel electrodes 162 and 172 while being electrically insulated from sub-pixel electrodes 162 and 172, so main pixel electrodes 161 and 171 and sub-pixel electrodes 162 and 172 can be individually operated.

For instance, voltages having various levels can be individually applied to main pixel electrodes 161 and 171 and sub-pixel electrodes 162 and 172. The alignment direction of the liquid crystal aligned on pixel electrodes 160 and 170 is changed according to the voltage applied to these pixel electrodes. Thus, the refractive index and light transmittance of the liquid crystal molecules are also changed, thereby representing various optical characteristics. The voltage applied to the first main pixel electrode 161 and the first sub-pixel electrode 162 of the first pixel area PA1 is adjusted to compensate optical properties between pixel electrode 161 and sub-pixel electrode 162 to improve the viewing angle of the liquid crystal display device in the first pixel area PA.

At the high gray scale, light transmittance is gradually reduced from the center to the lateral side of the liquid crystal display device thereby narrowing the viewing angle. However, the viewing angle of the liquid crystal display device can be widened at the high gray scale by applying different voltages to the first main pixel electrode 161 and the first sub-pixel electrode 162 based on the voltage-transmittance characteristics of the first main pixel electrode 161 and the first sub-pixel electrode 162. Such an increase of the viewing angle is also applicable for the second pixel electrode 170.

A first area divider 163 is formed in the first main pixel electrode 161 to divide pixel electrode 161 into a plurality of areas. The first area divider 163 includes notches which are obtained by cutting predetermined portions of the first main pixel electrode 161. In the same way, a boundary area can be formed between pixel electrode 161 and sub-pixel electrode 162 by cutting a predetermined portion of the first pixel electrode 160. If the number of the areas obtained by dividing the first main pixel electrode 161 is N, the first pixel electrode 160 including the first sub-pixel electrode 162 is divided into (N+1) areas. Similarly, a second area divider 173 is formed in the second main pixel electrode 171, so that the second pixel electrode 171 includes a plurality of areas, which are obtained by dividing the second main pixel electrode 171, and the second sub-pixel electrode 172.

Figure 2:
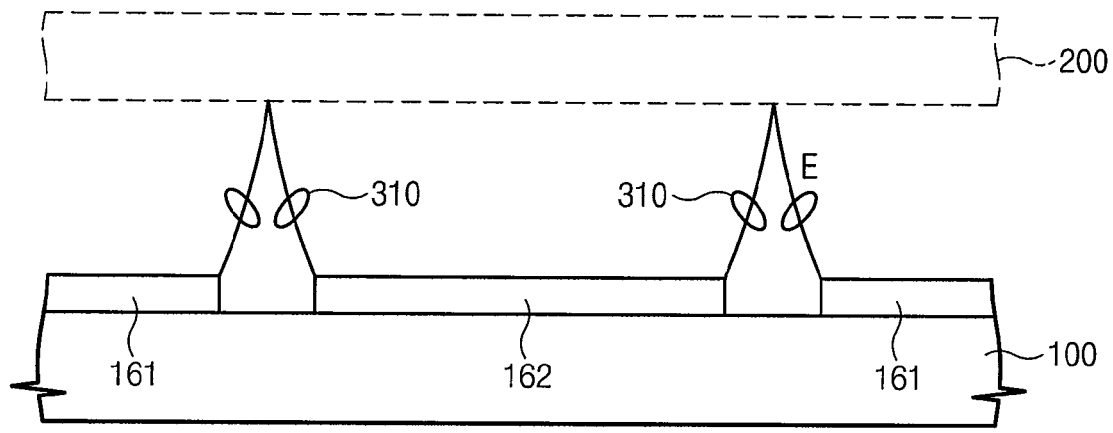
FIG. 2 is a sectional view taken along a line I-I' shown in FIG. 1.

FIG. 2 is a sectional view taken along a line I-I' shown in FIG. 1. Referring to FIG. 2, pixel electrode 160 including main pixel electrode 161 and sub-pixel electrode 162 is formed on substrate 100. A data voltage is applied to the first pixel electrode 160 according to display information, and a predetermined common voltage is applied to a second substrate 200 (dotted line) facing substrate 100. An electric field (E) is generated due to the potential difference between the data voltage and the common voltage. The electric field (E) is applied to liquid crystals 310 aligned between the first and second substrates 100 and 200.

The electric field (E) is created vertically to main pixel electrode 161 and sub-pixel electrode 162. The electric field (E) is tilted in the boundary area between pixel electrode 161 and sub-pixel electrode 162. If the liquid crystals 310 have negative dielectric anisotropy, the liquid crystals 310 are tilted vertically to the direction of the electric field (E).

As shown in FIG. 2, at the boundary area between the first main pixel electrode 161 and the first sub-pixel electrode 162 the liquid crystals 310 are tilted in different directions according to the electric field (E). The liquid crystals 310 are also tilted in different directions at boundaries between areas defined by area divider 173. The optical characteristics of each area may vary depending on the alignment direction of the liquid crystals 310. If the liquid crystals 310 are properly aligned to compensate for the optical characteristics between the areas, the operational characteristics of the liquid crystal display device can be improved. Such an effect is also applicable for the second pixel electrode 170.

Figure 3:
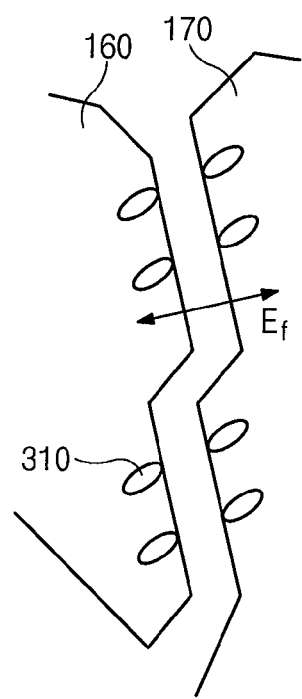
FIG. 3 is an enlarged view of "A" shown in FIG. 1.

FIG. 3 is an enlarged view of "A" shown in FIG. 1. Referring to FIG. 3, the first and second pixel electrodes 160 and 170 are adjacent to each other and outer contour parts thereof have a saw-tooth configuration. The saw-tooth shaped outer contour parts are asymmetrically formed and consist of long lateral sides inclined to the right and short lateral sides inclined to the left. The saw-tooth shaped outer contour parts of the first and second pixel electrodes 160 and 170 engage with each other, so that the long and short lateral sides of the first pixel electrode 160 may face the long and short lateral sides of the second pixel electrode 170, respectively. In this case, the operational characteristics of the liquid crystal display device can be improved as follows:

An inverse driving scheme can be employed when the voltage is applied to the first and second pixel electrodes 160 and 170 so that voltages having different polarities can be applied to the first and second pixel electrodes 160 and 170, respectively. That is, if a positive voltage is applied to the first pixel electrode 160 and a negative voltage is applied to the second pixel electrode 170 during a specific frame, the polarity of the voltages are reversed during the next frame. According to the inverse driving scheme, the alignment direction of the liquid crystals 310 is changed in the left or right direction as the frame is changed. That is, the liquid crystals 310 are prevented from being continuously aligned in the same direction, thereby preventing performance degradation of the liquid crystal display. Even if the inverse driving scheme is not employed, different voltages can be applied to the first and second pixel electrodes 160 and 170 when image information to be displayed on the first pixel area PA1 is different from image information to be displayed on the second pixel area PA2.

In this manner, when the different voltages are applied to the first and second pixel electrodes 160 and 170, the electric field is generated between the first and second pixel electrodes 160 and 170. The electric field (Ef) generated between the first and second pixel electrodes 160 and 170 will be referred to as a "lateral electric field" in order to distinguish the electric field (Ef) from the electric field (F) generated between the first and second substrates 100 and 200.

The direction of the lateral electric field (Ef) is changed according to the shape of the first and second pixel electrodes 160 and 170. If the shape of the first pixel electrode 160 corresponds to the shape of the second pixel electrode 160, the direction of the lateral electric field (Ef) may match with the direction of the electric field applied to the liquid crystals 310 in the first or second pixel electrode 160 or 170.

For instance, the length direction of the notches in the first pixel electrode 160 may match with the extension direction of the saw-tooth shaped long lateral sides of the first and second pixel electrodes 160 and 170. When the electric field is applied to the liquid crystals 310, the crystals located at the outer contour part of the first pixel electrode 160 are rapidly aligned in the direction identical to the alignment direction of the liquid crystals controlled by the middle of the first pixel electrode 160, thereby improving operational speed. In the same way, the liquid crystals existing at the outer contour part of the second pixel electrode 170 can be rapidly aligned when the electric field is applied thereto, so that the operational speed of the liquid crystal display device may be further improved.

In addition to the outer contour parts of the adjacent first and second pixel electrodes 160 and 170 that have engaging saw-tooth shapes, the outer contour parts that have other first and second pixel electrodes interposed between them may have engaging saw-tooth shapes. In this case, when the first and second pixel electrodes 160 and 170 are repeatedly aligned on substrate 100 by turns, all outer contour parts of the adjacent first and second pixel electrodes 160 and 170 have the saw-tooth shapes corresponding to each other. Accordingly, the operational speed may improve due to the saw-tooth shaped outer contour parts of the adjacent first and second pixel electrodes 160 and 170. In addition, the operational speed may improve if all outer contour parts of the first and second pixel electrodes 160 and 170 have the saw-tooth shapes, even if the saw-tooth shaped outer contour parts of the first and second pixel electrodes 160 and 170 are not adjacent to each other.

If the outer contour parts of the first and second pixel electrodes 160 and 170 have the saw-tooth shapes corresponding to each other, the shape of the first pixel electrode 160 is different from that of the second pixel electrode 170. In this case, the shape of the first main pixel electrode 161 is different from that of the second main pixel electrode 171 and the shape of the first sub-pixel electrode 162 is different from that of the second sub-pixel electrode 172. Nevertheless, the area ratio of the main pixel electrode 161 to the sub-pixel electrode 162 in the first pixel electrode 160 is equal to or approximate to the area ratio of the main pixel electrode 171 to the sub-pixel electrode 172 in the second pixel electrode 170.

In this case, the optical compensation between the first main pixel electrode 161 and the first sub-pixel electrode 162 of the first pixel electrode 160 is identical to the optical compensation between the second main pixel electrode 171 and the second sub-pixel electrode 172 of the second pixel electrode 170. Accordingly, the first and second pixel electrodes 160 and 170 can display images having superior quality.

Preferably, the area ratio is within a range between 1:1 and 3:1. More preferably, the area ratio is 2:1. The area ratio may vary depending on the alignment between main pixel electrodes 161 and 171 and sub-pixel electrodes 162 and 172 and the size of each area defined in main pixel electrodes 161 and 171. FIG. 1 shows the structure enabling the area ratio of 2:1.

Referring again to FIG. 1, the first sub-pixel electrode 162 has a size larger than that of any area defined in the first main pixel electrode 161. In order to allow the first sub-pixel electrode 162 to have the large size, the first sub-pixel electrode 162 is inclined from one edge of one long lateral side of the first pixel area PA1 to the center of the other long lateral side of the first pixel area PA1 having a rectangular shape. The divided areas constituting the first main pixel electrode 161 are separately aligned while interposing the first sub-pixel electrode 162 therebetween, in such a manner that the divided areas can be connected to each other at a bridge 10 formed in the longitudinal direction.

The second sub-pixel electrode 172 is inclined from one edge of one long lateral side of the second pixel area PA2 to the center of the other long lateral side of the second pixel area PA2 having a rectangular shape. In addition, the divided areas constituting the second main pixel electrode 171 are separately aligned while interposing the second sub-pixel electrode 172 therebetween. The first sub-pixel electrode 162 and the first area divider 163 are offset from the second sub-pixel electrode 172 and the second area divider 173 in such a manner that adjacent outer contour parts of the first and second pixel electrodes have the saw-tooth shape.

Figure 4:
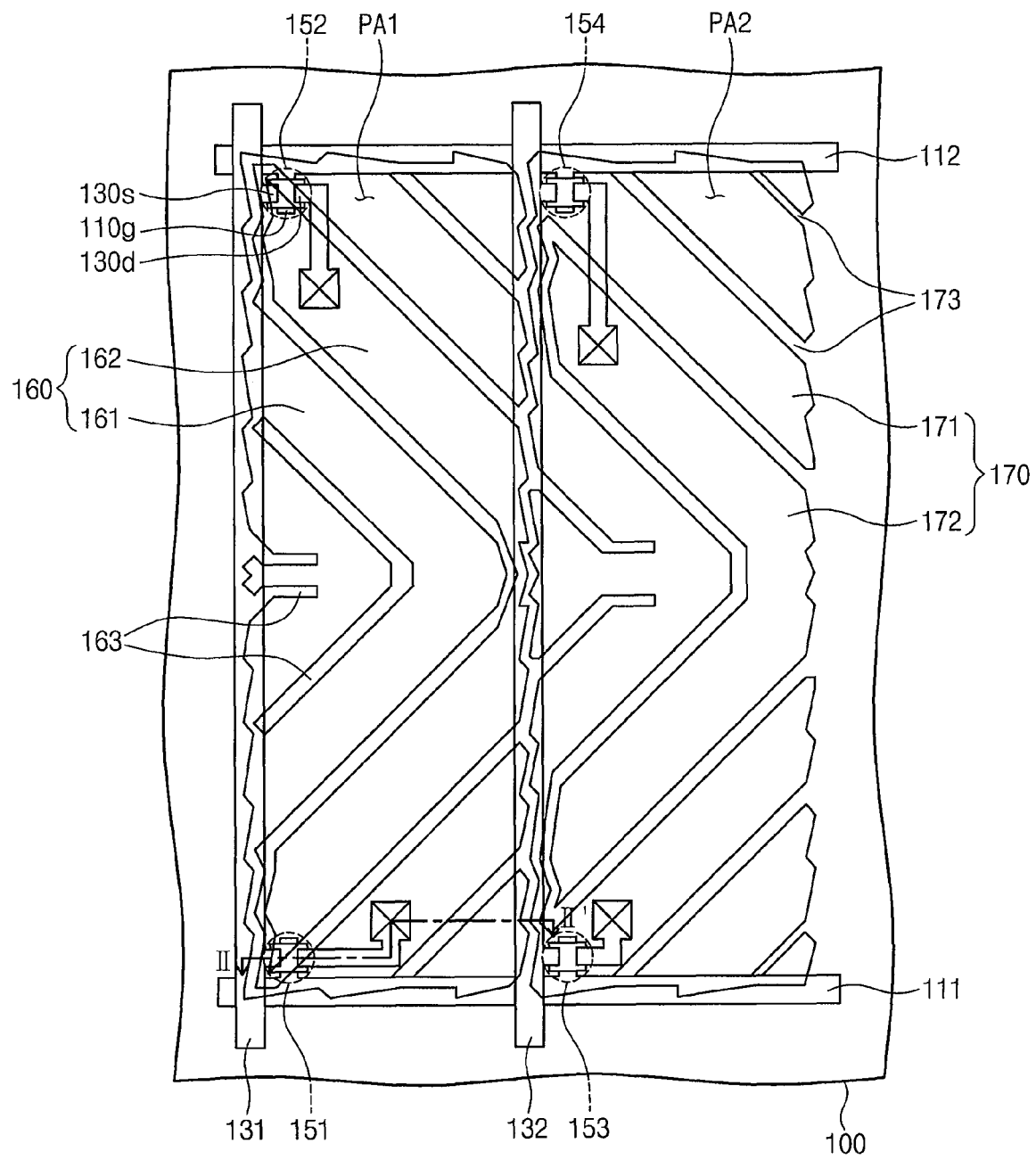
FIG. 4 is a plan view illustrating a liquid crystal display apparatus according to another embodiment of the present invention.

FIG. 4 is a plan view illustrating a liquid crystal display apparatus according to another embodiment of the present invention. Referring to FIG. 4, gate lines 111 and 112 and data lines 131 and 132 are formed on substrate 100 such that gate lines 111 and 112 are insulated from data lines 131 and 132 while crossing the data lines. Gate lines 111 and 112 include a main gate line 111 and a sub-gate line 112, and data lines 131 and 132 include a first data line 131 and a second data line 132. The main gate line 111, the sub-gate line 112 and the first data line 131 may define the first pixel area PA1, and the main gate line 111, the sub-gate line 112 and the second data line 132 may define the second pixel area PA2.

The first and second pixel areas PA1 and PA2 constitute the pixel areas PA1 and PA2. Although a plurality of pixel areas PA1 and PA2 are repeatedly defined in substrate 100 by means of gate lines 111 and 112 and data lines 131 and 132, the following description will be made in relation to the single pixel areas PA1 and PA2 for the purpose of convenience.

The first pixel electrode 160 is formed in the first pixel area PA1 and the second pixel electrode 170 is formed in the second pixel area PA2. The first pixel electrode 160 includes main pixel electrode 161 and sub-pixel electrode 162, and the second pixel electrode 170 includes main pixel electrode 171 and sub-pixel electrode 172. Pixel electrode 160 is provided with a main thin film transistor 151 and a sub-thin film transistor 152, and the second pixel electrode 170 is provided with a main thin film transistor 153 and a sub-thin film transistor 154.

The thin film transistors 151 to 154 include a gate electrode 110g, a source electrode 130s, and a drain electrode 130d, respectively. In the first main thin film transistor 151, the gate electrode 110g branches from the main gate line 111, the source electrode 130s branches from the first data line 131, and the drain electrode 130d is electrically connected to the first main pixel electrode 161. In the first sub-thin film transistor 152, the gate electrode 110g branches from the sub-gate line 112, the source electrode 130s branches from the first data line 131, and the drain electrode 130d is electrically connected to the first sub-pixel electrode 162.

During the operation of the liquid crystal display device, a gate-on signal is applied to the main gate line 111 and the sub-gate line 112, so that the first main thin film transistor 151 and the first sub-thin film transistor 152 are turned on. Then, a data signal corresponding to image information is applied to the first data line 131, and the data voltage is applied to the first main pixel electrode 161 and the first sub-pixel electrode 162. At this time, different gate-on signals are applied to first main thin film transistor 151 and the first sub-thin film transistor 152, respectively, so that a low voltage is applied to the first main pixel electrode 161 and a high voltage is applied to the first sub-pixel electrode 162.

In the second main thin film transistor 153, the gate electrode 110g branches from the main gate line 111, the source electrode 130s branches from the second data line 132, and the drain electrode 130d is electrically connected to the second main pixel electrode 171. In the second sub-thin film transistor 154, the gate electrode 110g branches from the sub-gate line 112, the source electrode 130s branches from the second data line 132, and the drain electrode 130d is electrically connected to the second sub-pixel electrode 172. The second pixel electrode 170 also operates in the same manner as the first pixel electrode 160.

Figure 5:
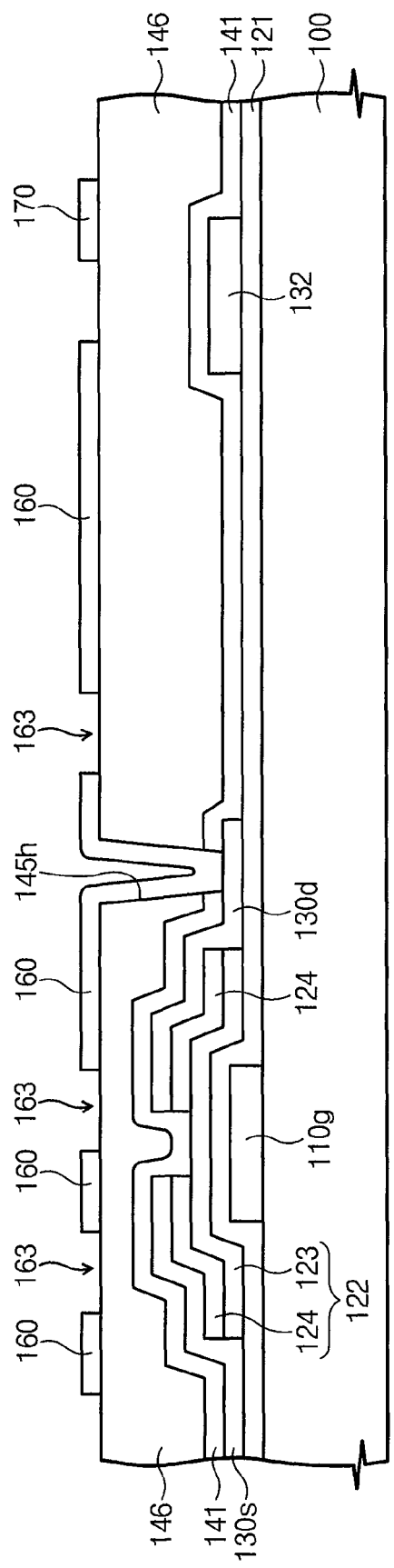
FIG. 5 is a sectional view taken along a line II-II' shown in FIG. 4.

FIG. 5 is a sectional view taken along a line II-II' shown in FIG. 4.

Referring to FIG. 5, the gate electrode 110g is formed on substrate 100. Gate electrode 110g may be prepared in the form of a single layer pattern including any one selected from the group consisting of aluminum based metal, silver based metal, copper based metal, molybdenum based metal, chrome, titanium and tantalum. Alternatively, gate electrode 110g may be in the form of a multi-layer pattern including plural materials, which are selected from the above metals having physical properties different from each other.

A gate insulating layer 121 is formed on the gate electrode 110g such that the gate insulating layer 121 covers the entire surface of substrate 100. The gate insulating layer 121 includes a transparent inorganic layer having a silicon nitride material and insulates the gate electrode 110g from the source electrode 130s and the drain electrode 130d.

A semiconductor pattern 122 is formed on the gate insulating layer 121 such that the semiconductor pattern 122 can be overlapped with the gate electrode 110g. The semiconductor pattern 122 is a dual-layer pattern consisting of an active pattern 123 and an ohmic contact pattern 124 and is obtained by depositing a hydrogenated amorphous silicon layer on the entire surface of substrate 100 and then patterning the hydrogenated amorphous silicon layer. A channel is formed in the active pattern 123 during the operation of the liquid crystal display device. The ohmic contact pattern 124 includes a hydrogenated amorphous silicon layer pattern doped with n-type impurity ions and is divided into two parts, which face each other on the gate electrode 110g.

The source electrode 130s and the drain electrode 130d are formed on the semiconductor pattern 122. The source electrode 130s is spaced apart from the drain electrode 130d in such a manner that the source electrode 130s faces the drain electrode 130d on the gate electrode 110g. Similar to the gate electrode 110g, the source electrode 130s and the drain electrode 130d are prepared in the form of single layer patterns including one selected from various metals or multi-layer patterns including plural materials having physical properties different from each other.

A protective layer 141 is formed on the source electrode 130s and the drain electrode 130d. The protective layer 141 includes a transparent inorganic layer having silicon nitride and an organic layer 146 is formed on the protective layer 141. The organic layer 146 includes a transparent material having a low dielectric constant and is formed with a large thickness. The protective layer 141 and the organic layer 146 are formed with a contact hole 145h, which exposes a predetermined region of the drain electrode 130d.

The pixel electrodes 160 and 170 are formed on the organic layer 146. The pixel electrodes 160 and 170 are obtained by patterning a transparent conductive layer, such as indium tin oxide (ITO) or indium zinc oxide (IZO). The first pixel electrode 160 electrically connected to the drain electrode 130d through the contact hole 145h. The second data line 132 is formed on the gate insulating layer 121 in such a manner that the second data line 132 can be overlapped with the first and second pixel electrodes 160 and 170.

The first and second pixel electrodes 160 and 170 are aligned on the second data line 132 such that the first pixel electrode 160 is adjacent to the second pixel electrode 170 as close as possible. This is advantageous in that a strong fringe field can be generated between the first and second pixel electrodes 160 and 170. However, this is not advantageous in that the second data line 132 is strongly coupled with the first and second pixel electrodes 160 and 170 when the data signal is transmitted to the second data line 132. According to the exemplary embodiment of the present invention, strong coupling between the second data line and the pixel electrodes can be prevented by a thick organic layer 146 having low dielectric constant permitting first pixel electrode 160 to be positioned closely adjacent to the second pixel electrode 170.

Figure 6:
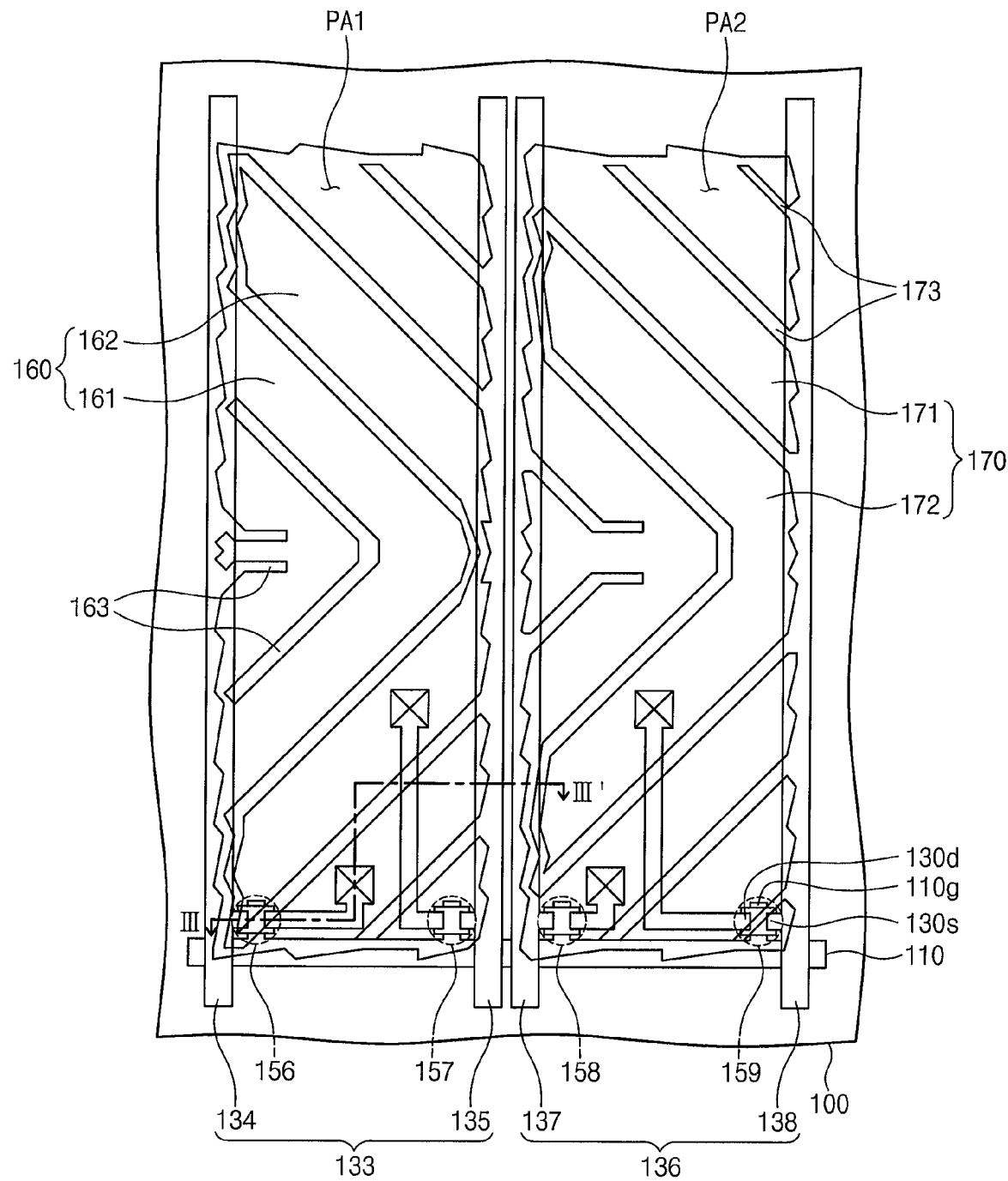
FIG. 6 is a plan view illustrating a liquid crystal display apparatus according to still another embodiment of the present.

FIG. 6 is a plan view illustrating a liquid crystal display apparatus according to still another embodiment of the present.

Referring to FIG. 6, gate lines 110 and data lines 133 and 136 are formed on substrate 100 such that the gate lines 110 are insulated from the data lines 133 and 136 while crossing the data lines 133 and 136. The data lines 133 and 136 include a first data line 133 and a second data line 136. The first data line 133 includes a first main data line 134 and a first sub-data line 135, and the second data line 136 includes a second main data line 137 and a second sub-data line 138. The gate line 110, the first main data line 134 and the first sub-data line 135 may define the first pixel area PA1. In addition, the gate line 110, a second main data line 137 and the second sub-data line 138 may define the second pixel area PA2.

The first and second pixel areas PA1 and PA2 constitute the pixel areas PA1 and PA2. Although a plurality of pixel areas PA1 and PA2 are repeatedly defined in substrate 100 by means of the gate lines 110 and data lines 133 and 136, the following description will be made in relation to the single pixel areas PA1 and PA2 for the purpose of convenience.

The first pixel electrode 160 is formed in the first pixel area PA1 and the second pixel electrode 170 is formed in the second pixel area PA2. The first pixel electrode 160 includes the first main pixel electrode 161 and the first sub-pixel electrode 162, and the second pixel electrode 170 includes the second main pixel electrode 171 and the second sub-pixel electrode 172. The first pixel electrode 160 is provided with a first main thin film transistor 156 and a first sub-thin film transistor 157, and the second pixel electrode 170 is provided with a second main thin film transistor 158 and a second sub-thin film transistor 159.

The thin film transistors 156 to 159 include a gate electrode 110g, a source electrode 130s, and a drain electrode 130d, respectively. In the first main thin film transistor 156, the gate electrode 110g branches from the main gate line 110, the source electrode 130s branches from the first main data line 134, and the drain electrode 130d is electrically connected to the first main pixel electrode 161. In the first sub-thin film transistor 157, the gate electrode 110g branches from the gate line 110, the source electrode 130s branches from the first sub-data line 135, and the drain electrode 130d is electrically connected to the first sub-pixel electrode 162.

During the operation of the liquid crystal display device, a gate-on signal is transmitted to the gate line 110, so that the first main thin film transistor 156 and the first sub-thin film transistor 157 are turned on. Then, a data signal corresponding to image information is transmitted to the first data line 133. In addition, a low voltage is applied to the first main pixel electrode 161 through the first main data line 134, and a high voltage is applied to the first sub-pixel electrode 162 through the first sub-data line 135.

In the second main thin film transistor 158, the gate electrode 110g branches from the main gate line 110, the source electrode 130s branches from the second main data line 137, and the drain electrode 130d is electrically connected to the second main pixel electrode 171. In the second sub-thin film transistor 159, the gate electrode 110g branches from the gate line 110, the source electrode 130s branches from the second sub-data line 138, and the drain electrode 130d is electrically connected to the second sub-pixel electrode 172. The second pixel electrode 170 also operates in the same manner as the first pixel electrode 160.

Figure 7:
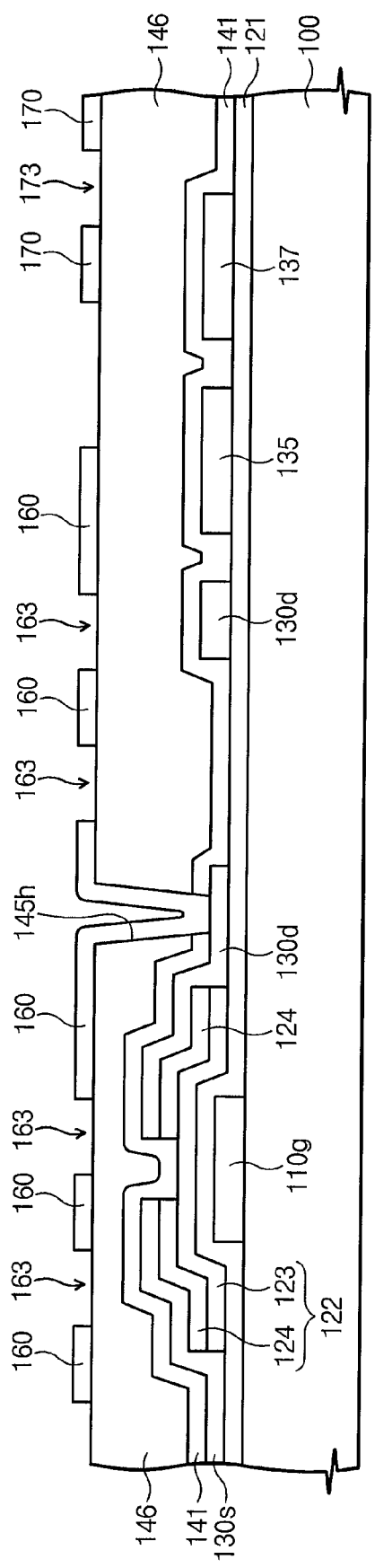
FIG. 7 is a sectional view taken along a line III-III' shown in FIG. 6.

FIG. 7 is a sectional view taken along a line III-III' shown in FIG. 6.

Referring to FIG. 7, the gate electrode 110g, the source electrode 130s and the drain electrode 130d of the first main thin film transistor 156 are formed on a predetermined area of substrate 100. The drain electrode 130d of the first sub-thin film transistor 157 is formed while being spaced apart from the first main thin film transistor 156. In addition, the first sub-data line 135 is aligned in parallel to the second main data line 137. The first pixel electrode 160 is formed on the first sub-data line 135 and the second pixel electrode 170 is formed on the second main data line 137.

Figure 8A:
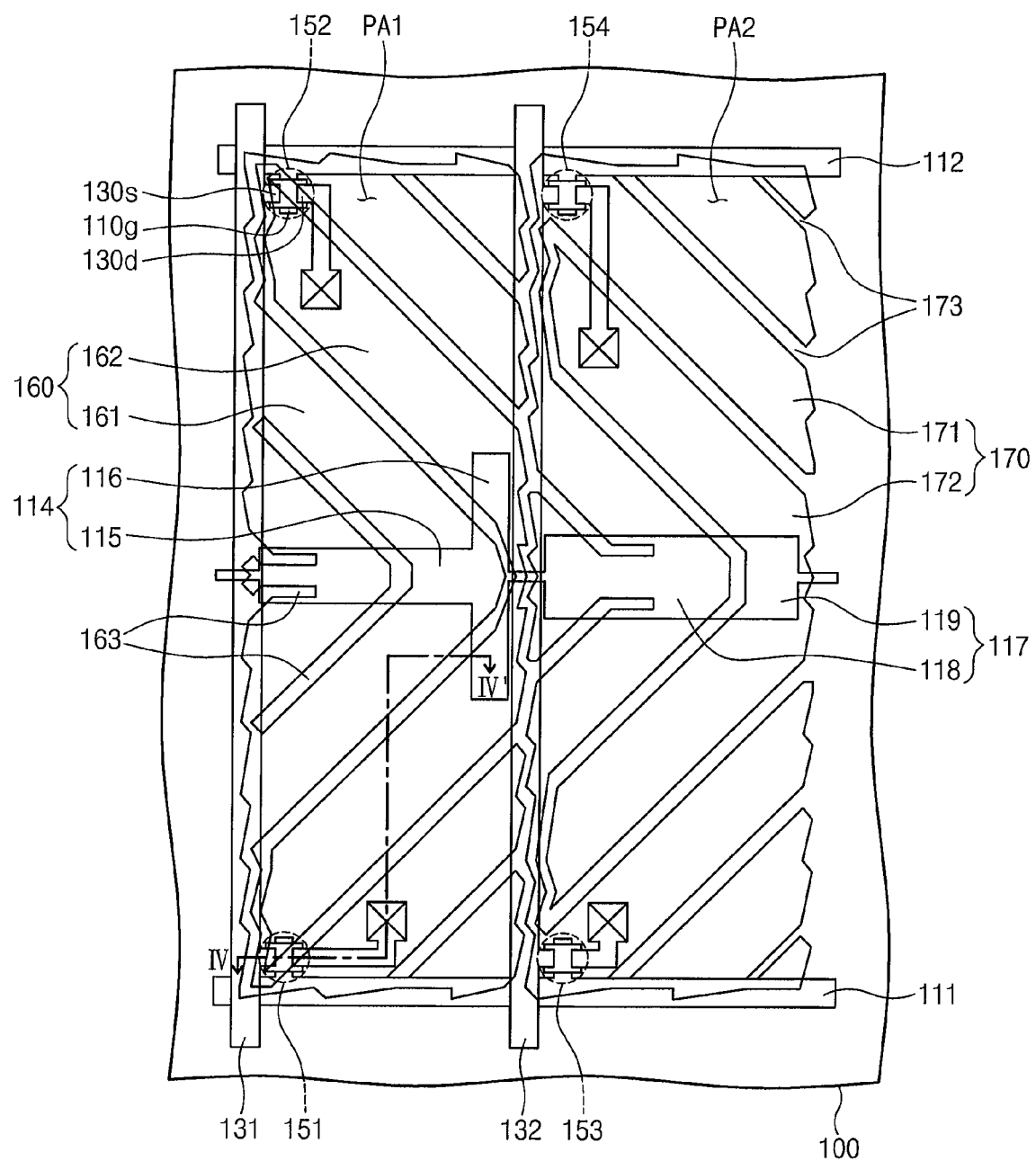
FIGS. 8A and 8B are plan views illustrating liquid crystal display apparatuses according to still yet another embodiment of the present invention.

FIG. 8A is a plan view illustrating a liquid crystal display apparatus according to still yet another embodiment of the present invention. The liquid crystal display apparatus shown in FIG. 8A is similar to the liquid crystal display device shown in FIG. 4, so the following description will be focused on the different parts therebetween in order to avoid redundancy.

Referring to FIG. 8A, a first storage electrode 114 is formed between substrate 100 and the first pixel electrode 160, and a second storage electrode 117 is formed between substrate 100 and the second pixel electrode 170. The first storage electrode 114 is partially overlapped with the first main pixel electrode 161 and the first sub-pixel electrode 162. Hereinafter, the part of the first storage electrode 114, which overlap the first main pixel electrode 161 will be referred to as a "first main storage electrode 115", and the part of the first storage electrode 114 which overlaps the first sub-pixel electrode 162 will be referred to as a "first sub-storage electrode 116".

The first storage electrode 114 overlaps the first pixel electrode 160, thereby forming a first storage capacitor. The first storage capacitor maintains the data signal applied to the first pixel electrode 160 for a predetermined period of time. The first storage electrode 114 includes a light blocking material, such as copper or aluminum, which is identical to a material of the gate electrode 110g, and is formed simultaneously with the gate electrode 110g. The rest of the first pixel electrode 160 area not covered by the light blocking material serves to display an image. The structure, function and material of the first storage electrode 114 are substantially similar to those of the second storage electrode 117.

The aperture ratio of main pixel electrodes 161 and 171 may be different from the aperture ratio of sub-pixel electrodes 162 and 172 depending on the shape of the first and second storage electrodes 114 and 117 even if the area ratio of main pixel electrodes 161 and 171 to sub-pixel electrodes 162 and 172 are fixedly set in the first and second pixel electrodes 160 and 170. According to the present invention, the aperture ratio of main pixel electrodes 161 and 171 can be set identically to the aperture ratio of sub-pixel electrodes 162 and 172, which will be described below.

In FIG. 8A, when drawing a virtual line that transversely bisects the first and second pixel electrodes 160 and 170, the first main storage electrode 115 and the second main storage electrode 118 are provided along the virtual line with rectangular shapes. In addition, the first main pixel electrode 161 has an area larger than that of the second main pixel electrode 171 when viewed in the lengthwise direction of the virtual line. Accordingly, if the first main storage electrode 115 has a width smaller than that of the second main storage electrode 118 in the direction vertical to the lengthwise direction of the virtual line, the first main storage electrode 115 has an area identical to that of the second main storage electrode 118.

A second sub-storage electrode 119 is formed along the virtual line with a rectangular shape. The first sub-pixel electrode 162 has a very small area when viewed in the lengthwise direction of the virtual line. Therefore, the first sub-storage electrode 116 may not have sufficient area corresponding to the area of the second sub-storage electrode 119. Accordingly, the first sub-storage electrode 116 must branch from the first main storage electrode 115 in both directions vertical to the virtual line. The length of the branch part of the first sub-storage electrode 116 is properly adjusted in such a manner that the first sub-storage electrode 116 has an area identical to that of the second sub-storage electrode 119.

In this manner, if the areas of the first and second main storage electrodes 115 and 118 are the same as the areas of the first and second sub-storage electrodes 116 and 119, the aperture ratios of the first main pixel electrode 161 and the first sub-pixel electrode 162 become the same as the aperture ratios of the second main pixel electrode 171 and the second sub-pixel electrode 172.

Figure 8B:
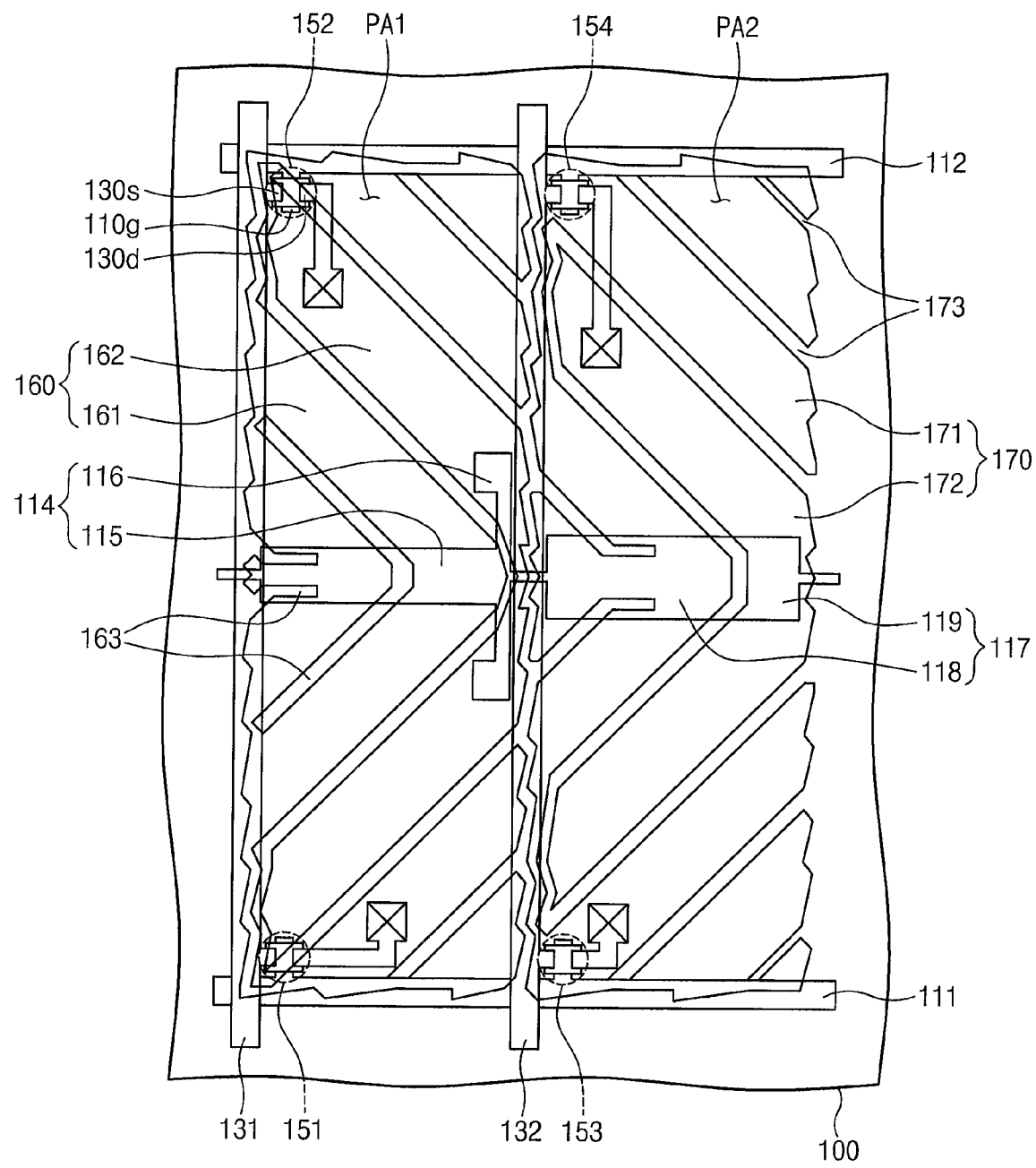

FIG. 8B is a plan view illustrating a liquid crystal display apparatus according to still yet another embodiment of the present invention. The liquid crystal display apparatus shown in FIG. 8B is partially identical to the liquid crystal display device shown in FIG. 8A, so the following description will be focused on the different parts therebetween in order to avoid redundancy.

Referring to FIG. 8B, the first sub-storage electrode 116 primarily branches from the first main storage electrode 115 in a direction vertical to the first main storage electrode 115. In this state, both end portions of the first sub-storage electrode 116 secondarily extend lengthwise along the first main storage electrode 115. Such a dual-branch structure of the first sub-storage electrode 116 is necessary when the first sub-storage electrode 116, which branches from the first main storage electrode 115, has no sufficient area corresponding to the second sub-storage electrode 119.

In addition to the embodiments shown in FIGS. 8A and 8B, various shapes or configurations can be provided in order to allow the first storage electrode 114 to have an area ratio identical to that of the second storage electrode 117. Hereinafter, description will be made in relation to the sectional structure of the liquid crystal display device having the first and second storage electrode 114 and 117. Although the sectional structure of the liquid crystal display device shown in FIG. 8A will be described below, it should be noted that the liquid crystal display device shown in FIG. 8B also has a similar sectional structure.

Figure 9:
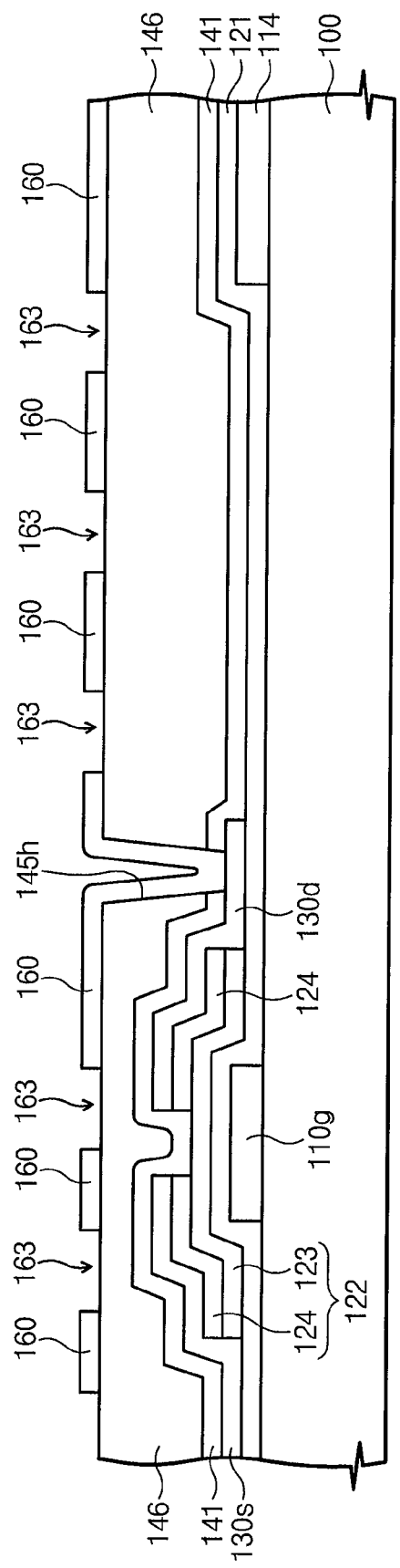
FIG. 9 is a sectional view taken along a line IV-IV' shown in FIG. 8A.

FIG. 9 is a sectional view taken along a line IV-IV' shown in FIG. 8A.

Referring to FIG. 9, the gate electrode 110g and the first storage electrode 114, which is spaced apart from the gate electrode 110g, are formed on substrate 100. The gate electrode 110g and the first storage electrode 114 are covered with the gate insulating layer 121. The semiconductor pattern 122, the source electrode 130s and the drain electrode 130d are formed on the insulating layer 121 covering the gate electrode 110g. In addition, the protective layer and the organic layer 146 are formed on the source electrode 130s and the drain electrode 130d.

The first storage electrode 114 vertically faces the first pixel electrode 160, and the gate insulating layer 121, the protective layer 141 and the organic layer 146 are interposed between the first storage electrode 114 and the first pixel electrode 160. As a result, the first storage capacitor is formed. The capacitance of the first storage capacitor may vary depending on the distance between the first storage electrode 114 and the first pixel electrode 160 and the dielectric constant of the gate insulating layer 121, the protective layer 141 and the organic layer 146 interposed between the first storage electrode 114 and the first pixel electrode 160. In order to increase the capacitance of the first storage capacitor by reducing the distance between the first storage electrode 114 and the first pixel electrode 160, a predetermined area of the organic layer 146 is opened and the first pixel electrode 160 is inserted into the opening section of the organic layer 146.

Figure 10:
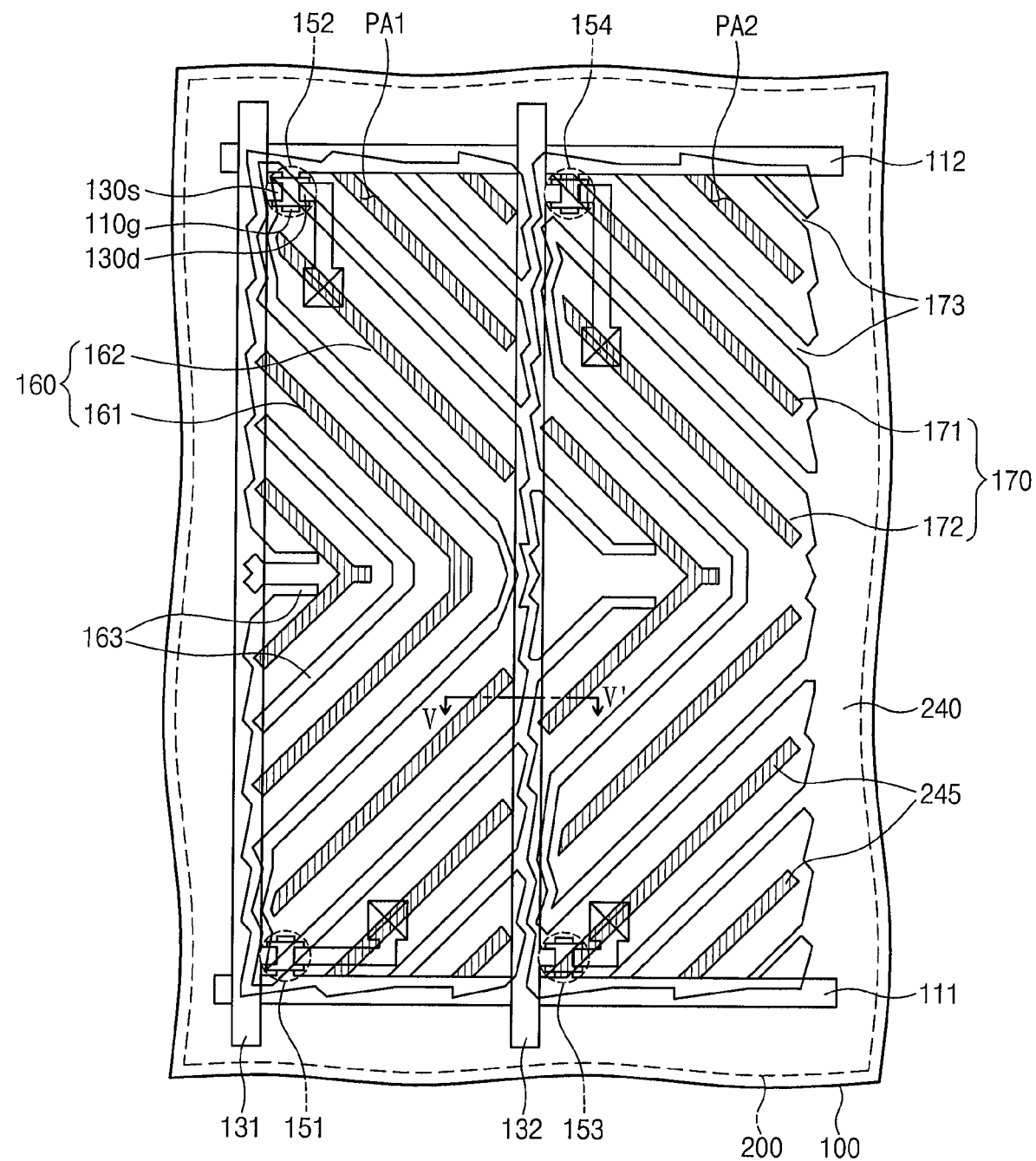
FIG. 10 is a plan view illustrating a liquid crystal display apparatus according to still yet another embodiment of the present.

FIG. 10 is a plan view illustrating a liquid crystal display apparatus according to still yet another embodiment of the present. The liquid crystal display apparatus shown in FIG. 10 is similar to the liquid crystal display device shown in FIG. 4, so the following description will be focused on the different parts therebetween in order to avoid redundancy.

Referring to FIG. 10, the liquid crystal display apparatus includes substrate 100 and the second substrate 200. The pixel areas PA1 and PA2 are defined in substrate 100 and first and second pixel electrodes 160 and 170 are formed in the pixel areas PA1 and PA2. The first pixel electrode 160 includes the first main pixel electrode 161 and the first sub-pixel electrode 162, and the second pixel electrode 170 includes the second main pixel electrode 171 and the second sub-pixel electrode 172. The second substrate 200 is formed with the common electrode 240 which faces the first and second pixel electrodes 160 and 170.

The first main pixel electrode 161 is formed with the first area divider 163, and the second main pixel electrode 171 is formed with the second area divider 173. A third area divider 245 is formed in the common electrode 240. The third area divider 245 is spaced apart from the first and second area dividers 163 and 173 and interacts with the first and second area dividers 163 and 173, thereby dividing the pixel areas PA1 and PA2 into a plurality of areas.

The first, second and third area dividers 163, 173 and 245 can be obtained by cutting predetermined portions of the first and second pixel electrodes 160 and 170 and the common electrode 240, respectively. Such cutting portions may change the electric field between the first and second pixel electrodes 160 and 170 and the common electrode 240, thereby widening the viewing angle of the liquid crystal display device. The first, second and third area dividers 163, 173 and 245 can be prepared in the form of protrusions provided on the first and second pixel electrodes 160 and 170 and the common electrode 240, respectively.

Figure 11A:
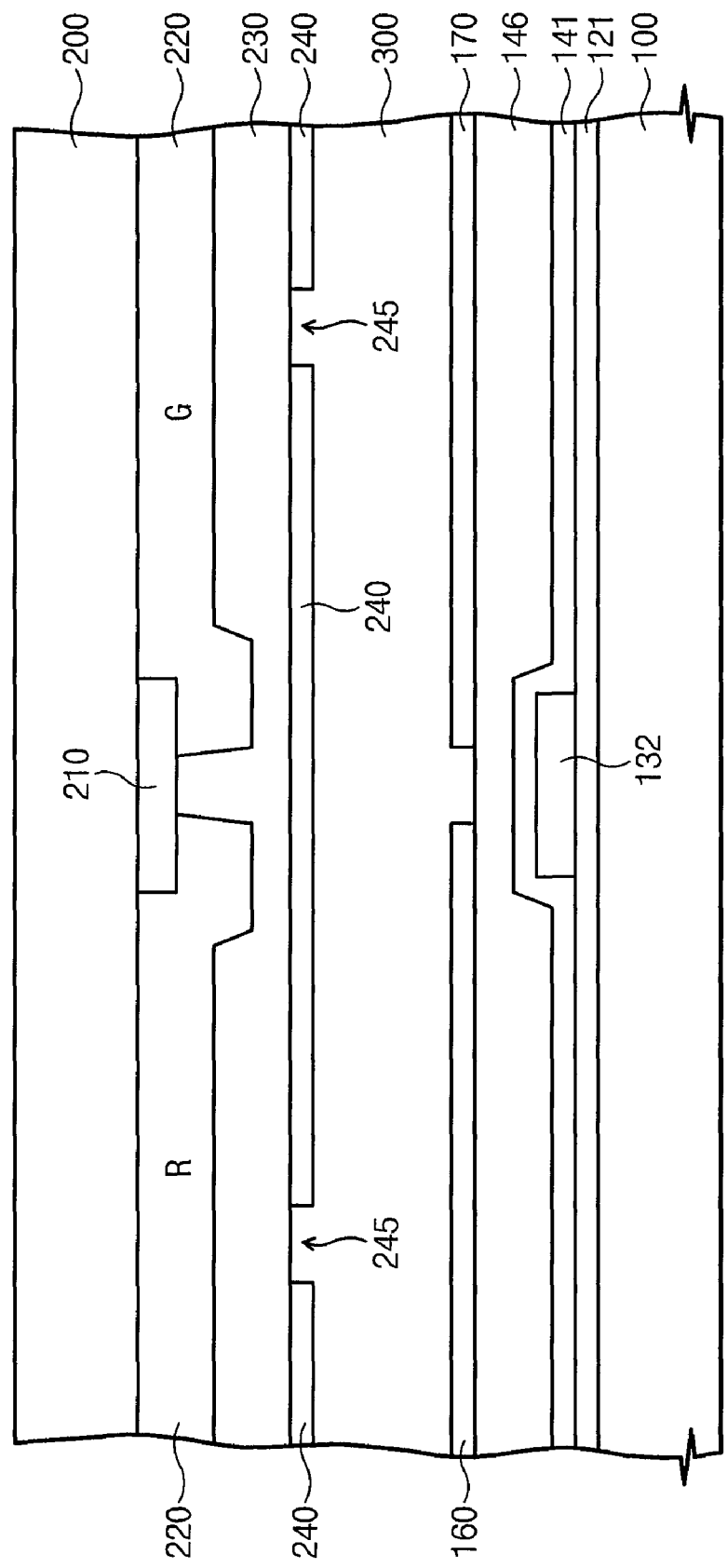

FIGS. 11A and 11B are sectional views taken along a line V-V' shown in FIG. 10.

Referring to FIG. 11A, the liquid crystal layer 300 including liquid crystals is interposed between the first and second substrates 100 and 200. The second data line 132 is formed on the gate insulating layer 121 of substrate 100 near the boundary area between the first and second pixel electrodes 160 and 170.

A light blocking pattern 210 is formed on the second substrate 200 at a position corresponding to the boundary area between the first and second pixel electrodes 160 and 170 in order to shield light, except for light introduced into the first and second pixel electrodes 160 and 170. The light blocking pattern 210 is formed thereon with a color filter 220, which filters white light having a specific wavelength band so as to provide color images. The color filter 220 includes a red filter R, a green filter G and a blue filter (not shown), which are alternately aligned and correspond to three primary colors of light. An overcoat layer 230 is formed on the color filter 220 so as to planarize the surface of the second substrate 200 and to protect the color filter 220. The common electrode 240 is formed on the overcoat layer 230. The common electrode 240 includes a material identical to a material of the pixel electrodes 160 and 170. Predetermined portions of the common electrode 240 are cut so as to form the third area divider 245 to widen the viewing angle of the liquid crystal display device.

Referring to FIG. 11B, the protective layer 141 and a color filter 148 are formed on the second data line 132 of substrate 100. The color filter 148 is used to represent color images. In addition, the color filter 148 restricts coupling between the second data line 132 and the pixel electrodes 160 and 170, in lieu of the organic layer 146. If the color filter 148 is formed on substrate 100 where the pixel areas PA1 and PA2 are defined, the color filter 148 can be prevented from being misaligned with respect to the pixel areas PA1 and PA2 when fabricating the liquid crystal display device.

According to another embodiment of the present invention, the light blocking pattern 210 is formed on the second substrate 200 and the overcoat layer 230 is formed on the light blocking pattern 210. In addition, the common electrode 240 is formed on the overcoat layer 230 and protrusions are formed on the common electrode 240 as the third area divider 245 to widen the viewing angle of the liquid crystal display device.

As described above, according to the present invention, the viewing angle of the liquid crystal display device can be widened and the operational speed of the liquid crystal display device can be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
    a first substrate having adjacent first and second pixel areas;
    a first pixel electrode formed on the first substrate in the first pixel area;
    a second pixel electrode formed on the first substrate in the second pixel area; and
    a first storage electrode formed in the first pixel area between the first substrate and the first pixel electrode, the first storage electrode comprising a first main storage electrode and a first sub-storage electrode; and
    a second storage electrode formed in the second pixel area between the first substrate and the first second pixel electrode,
    wherein the first pixel electrode includes a first main pixel electrode and a first sub-pixel electrode, the second pixel electrode includes a second main pixel electrode and a second sub-pixel electrode,
    the first main pixel electrode, the first sub-pixel electrode, the second main pixel electrode, and the second sub-pixel electrode have a different shape from each other,
    the first sub-storage electrode vertically branches from the first main storage electrode, in which both end portions of the first sub-storage electrode extend lengthwise along the first main storage electrode, and
    the second storage electrode extends lengthwise along the first main storage electrode.

2. The display apparatus of claim 1, wherein an area ratio of the first main pixel electrode to the first sub-pixel electrode_is within a range of 1:1 to 3:1, and an area ratio of the second main pixel electrode to the second sub-pixel electrode is within a range of 1:1 to 3:1.

3. The display apparatus of claim 1, further comprising a first area divider dividing the first main pixel electrode in the first pixel area into a plurality of areas, and a second area divider dividing the second main pixel electrode in the second pixel area into a plurality of areas.

4. The display apparatus of claim 3, wherein an area ratio of the first main pixel electrode to the first sub-pixel electrode is 2:1, and an area ratio of the second main pixel electrode to the second sub-pixel electrode is 2:1.

5. The display apparatus of claim 3, wherein the first and second area dividers include notches, which are formed by cutting predetermined areas of the first and second main pixel electrodes.

6. The display apparatus of claim 5, wherein the notches include a first portion extending vertically toward a boundary area between the first and second pixel areas, and a second portion tilted with respect to the boundary area.

7. The display apparatus of claim 3, wherein the first and second pixel electrodes have adjacent outer contour parts facing each other and the adjacent outer contour parts of the first and second pixel electrodes have saw-tooth shapes which engage with each other.

8. The display apparatus of claim 7, wherein non-adjacent outer contour parts of the first and second pixel electrodes opposite the adjacent outer contour parts of the first and second pixel electrodes have saw-tooth shapes corresponding to each other.

9. The display apparatus of claim 1, wherein a data voltage corresponding to image information is applied to the first and second pixel electrodes, a voltage which is higher than a voltage applied to the first main pixel electrode is applied to the first sub-pixel electrode, and a voltage which is higher than a voltage applied to the second main pixel electrode is applied to the second sub-pixel electrode.

10. The display apparatus of claim 1, wherein the second storage electrode has a shape different from a shape of the first storage electrode.

11. The display apparatus of claim 10, wherein the first main storage electrode, is overlapped with the first main pixel electrode, the first sub-storage electrode, is overlapped with the first sub-pixel electrode, and the second storage electrode includes a second main storage electrode, which is overlapped with the second main pixel electrode, and a second sub-storage electrode, which is overlapped with the second sub-pixel electrode.

12. The display apparatus of claim 11, wherein an area ratio of the first main storage electrode to the first sub-storage electrode is identical to an area ratio of the second main storage electrode to the second sub-storage electrode.

13. The display apparatus of claim 1, further comprising a gate line and a data line formed on the first substrate so as to define the pixel areas.

14. The display apparatus of claim 13, wherein the outer contour parts of the first and second pixel electrodes both overlap the data line.

15. The display apparatus of claim 14, further comprising an organic layer interposed between the data line and the first and second pixel electrodes in the first and second pixel areas.

16. The display apparatus of claim 14, further comprising a color filter interposed between the data line and the first and second pixel electrodes.

17. The display apparatus of claim 13, wherein the gate line includes a main gate line and a sub-gate line, which face each other while interposing the pixel electrodes therebetween, the data line includes a first data line and a second data line, which face each other while interposing the first pixel electrode therebetween, and the display apparatus further comprises a first main thin film transistor connected to the main gate line, the first data line and the first main pixel electrode, a first sub-thin film transistor connected to the sub-gate line, the first data line and the first sub-pixel electrode, a second main thin film transistor connected to the main gate line, the second data line and the second main pixel electrode, and a second sub-thin film transistor connected to the sub-gate line, the second data line and the second sub-pixel electrode.

18. The display apparatus of claim 13, wherein the data line includes a first main data line and a first sub-data line, which face each other while interposing the first pixel electrode therebetween, and a second main data line and a second sub-data line, which face each other while interposing the second pixel electrode therebetween, and the display apparatus further comprises a first main thin film transistor connected to the gate line, the first main data line and the first main pixel electrode, a first sub-thin film transistor connected to the gate line, the first sub-data line and the first sub-pixel electrode, a second main thin film transistor connected to the gate line, the second main data line and the second main pixel electrode, and a second sub-thin film transistor connected to the gate line, the second sub-data line and the second sub-pixel electrode.

19. The display apparatus of claim 1, further comprising a second substrate coupled with the first substrate and a common electrode formed on the second substrate while facing the first and second pixel electrodes in the first and second pixel areas.

20. The display apparatus of claim 19, further comprising first and second area dividers formed on the first and second main pixel electrodes, respectively, and a third area divider formed on the common electrode while being spaced apart from the first and second area dividers, wherein the third area divider interacts with the first and second area dividers so as to divide the pixel areas into a plurality of areas.

21. The display apparatus of claim 20, wherein the first and second area dividers include notches, which are formed by cutting predetermined areas of the first and second main pixel electrodes, and the third area divider includes notches formed by cutting predetermined areas of the common electrode.

22. The display apparatus of claim 20, wherein the first and second area dividers include notches, which are formed by cutting predetermined areas of the first and second main pixel electrodes, and the third area divider includes protrusions formed on predetermined areas of the common electrode.

23. A display apparatus comprising:
a first substrate;
a first pixel electrode comprising a first main electrode and a first sub-pixel electrode in a first pixel area;
a second pixel electrode comprising a second main electrode and a second sub-pixel electrode in a second pixel area;
a first storage electrode formed in the first pixel area between the first substrate and the first pixel electrode, the first storage electrode comprising a first main storage electrode and a first sub-storage electrode; and
a second storage electrode formed in the second pixel area between the first substrate and the first second pixel electrode,
wherein the first pixel electrode and the second pixel electrode have adjacent outer contour parts facing each other in a zigzag pattern,
the first main pixel electrode, the first sub-pixel electrode, the second main pixel electrode, and the second sub-pixel electrode have a different shape from each other,
an area ratio of the first main pixel electrode to the first sub-pixel electrode of the first pixel electrode is the same as an area ratio of the second main pixel electrode to the second sub-pixel electrode of the second pixel electrode,
the first sub-storage electrode vertically branches from the first main storage electrode, in which both end portions of the first sub-storage electrode extend lengthwise along the first main storage electrode, and
the second storage electrode extends lengthwise along the first main storage electrode.

24. The display apparatus of claim 23, wherein the area ratio of the first main pixel electrode to the first sub-pixel electrode is within a range of 1:1 to 3:1.

25. The display apparatus of claim 1, wherein an area ratio of the main pixel electrode to the sub-pixel electrode of the first pixel area is the same as an area ratio of the main pixel electrode to the sub-pixel electrode of the second pixel area.

26. The display apparatus of claim 1, wherein the first and second pixel electrodes of the first and second pixel areas have adjacent uneven outer contour parts facing each other and engaging each other.

* * * * *